(12) United States Patent
Jiang et al.

(10) Patent No.: US 11,027,334 B2
(45) Date of Patent: Jun. 8, 2021

(54) MICRO-NANO COMPOSITE POWDER DEDICATED FOR LASER REPAIR OF TINY CRACKS IN STAINLESS STEEL SURFACE

(71) Applicant: DALIAN UNIVERSITY OF TECHNOLOGY, Dalian (CN)

(72) Inventors: Wei Jiang, Dalian (CN); Xianfeng Jiang, Dalian (CN); Yinyin Li, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 470 days.

(21) Appl. No.: 16/076,816

(22) PCT Filed: May 4, 2017

(86) PCT No.: PCT/CN2017/083107
§ 371 (c)(1),
(2) Date: Aug. 9, 2018

(87) PCT Pub. No.: WO2018/094969
PCT Pub. Date: May 31, 2018

(65) Prior Publication Data
US 2019/0015898 A1     Jan. 17, 2019

(30) Foreign Application Priority Data

Nov. 24, 2016   (CN) .......................... 201611052058.6

(51) Int. Cl.
*B22F 1/00* (2006.01)
*C23C 24/10* (2006.01)
(Continued)

(52) U.S. Cl.
CPC .......... *B22F 1/0022* (2013.01); *B22F 1/0014* (2013.01); *B23P 6/04* (2013.01);
(Continued)

(58) Field of Classification Search
CPC .................. B22F 1/0022; B22F 1/0014; B22F 2007/068; B22F 2301/15; B22F 2301/35;
(Continued)

(56) References Cited

U.S. PATENT DOCUMENTS 5,641,921 A  *  6/1997  Dennis .................... B22F 3/105
                                                          148/206
2010/0086702 A1*  4/2010  Blankenship ........ B23K 10/027
                                                          427/554
(Continued)

FOREIGN PATENT DOCUMENTS

CN         1542166 A  *  11/2004
CN     102677044 A  *   9/2012
(Continued)

OTHER PUBLICATIONS

Machine Translation of CN-105132916-A (Year: 2015).*
(Continued)

*Primary Examiner* — Paul A Wartalowicz
*Assistant Examiner* — Ryan L Heckman
(74) *Attorney, Agent, or Firm* — Muncy, Geissler, Olds and Lowe, P.C.

(57) ABSTRACT

A micro-nano composite powder dedicated for laser repair of tiny crack on stainless steel surface, includes 3 wt %-7 wt % of nano-WC, 0.5 wt %-2 wt % of nano-$Al_2O_3$, 0.2 wt %-0.8 wt % of micro-V powder and the balance of micro stainless steel powder. The stainless steel powder includes 0.08 wt % of C, 0.5 wt % of Si, 1.46 wt % of Mn, 0.03 wt % of P, 0.005 wt % of S, 19 wt % of Cr, 9.5 wt % of Ni, 0.5 wt % of Mo and the balance of Fe. The micro and nano powders are mixed through ball milling and mixed with anhydrous ethanol. The composite powder is suitable for laser repair of tiny crack on the surface of stainless steel part with high toughness requirement. After laser repair, the
(Continued)

composite powder can be fused with the substrate, the repaired layer and the substrate are metallurgically bonded at the interface, the repaired layer contains fine grains, and therefore the compatibility and fracture property of the repaired layer are improved.

8 Claims, 2 Drawing Sheets

(51) Int. Cl.
     *B23P 6/04*      (2006.01)
     *C22C 38/44*      (2006.01)
     *C22C 38/04*      (2006.01)
     *C22C 38/02*      (2006.01)
     *C22C 38/40*      (2006.01)
     *C22C 1/10*      (2006.01)
     *B22F 7/06*      (2006.01)

(52) U.S. Cl.
     CPC ............ *C22C 1/1084* (2013.01); *C22C 38/02* (2013.01); *C22C 38/04* (2013.01); *C22C 38/40* (2013.01); *C22C 38/44* (2013.01); *C23C 24/103* (2013.01); *B22F 2007/068* (2013.01); *B22F 2301/15* (2013.01); *B22F 2301/35* (2013.01); *B22F 2301/40* (2013.01); *B22F 2302/10* (2013.01); *B22F 2302/253* (2013.01); *B22F 2304/054* (2013.01); *B22F 2999/00* (2013.01)

(58) Field of Classification Search
     CPC .............. B22F 2301/40; B22F 2302/10; B22F 2302/253; B22F 2304/054; B22F 2999/00; B23P 6/04; C22C 1/1084; C22C 38/02; C22C 38/04; C22C 38/40; C22C 38/44; C23C 24/103
See application file for complete search history.

(56) References Cited

U.S. PATENT DOCUMENTS

2014/0065320 A1\*   3/2014   Lin ..................... B23K 26/348
                                                         427/554
2015/0027993 A1\*   1/2015   Bruck ................. B23K 35/327
                                                         219/73.2

FOREIGN PATENT DOCUMENTS

| CN | 103286310 A | | 9/2013 |
|---|---|---|---|
| CN | 105132916 A | \* | 12/2015 |
| CN | 105132916 A | | 12/2015 |
| CN | 105714286 A | | 6/2016 |
| CN | 105714286 B | \* | 6/2016 |
| CN | 106031948 A | | 10/2016 |
| JP | H 08104940 A | | 4/1996 |

OTHER PUBLICATIONS

Machine Translation of CN-105714286-B (Year: 2016).\*
Machine Translation of CN-1542166-A (Year: 2004).\*
Machine Translation of CN-102677044-A (Year: 2012).\*

\* cited by examiner

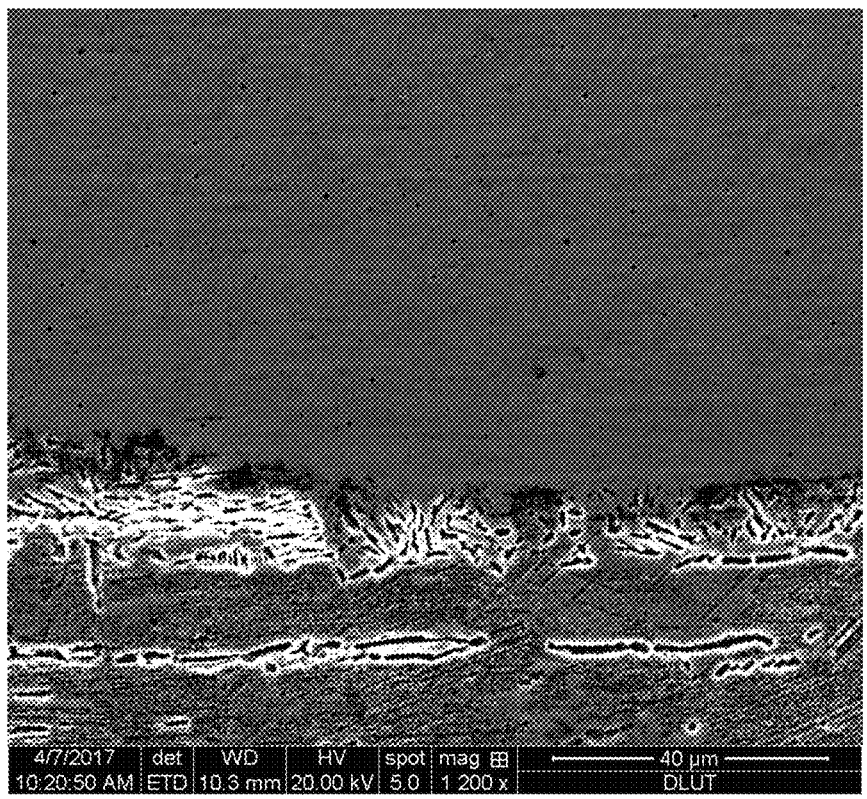
Fig. 3(Fig.3 as an illustration in Abstract)
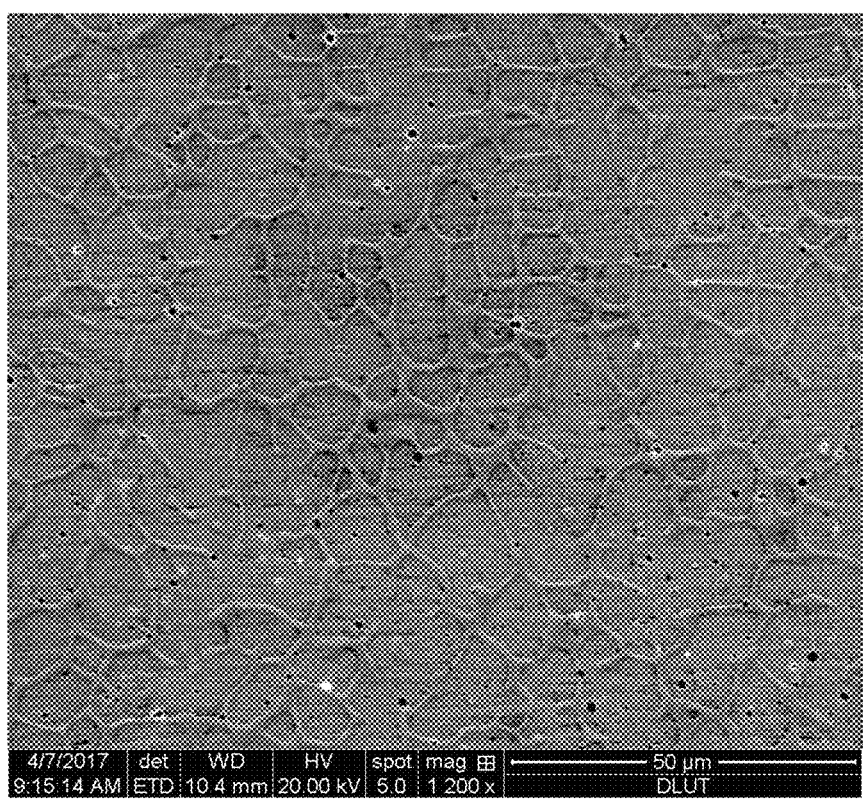
Fig. 4

MICRO-NANO COMPOSITE POWDER DEDICATED FOR LASER REPAIR OF TINY CRACKS IN STAINLESS STEEL SURFACE

TECHNICAL FIELD

The present invention belongs to the technical field of laser repair, and particularly relates to a micro-nano composite powder dedicated for laser repair of tiny cracks in stainless steel surface.

BACKGROUND

Stainless steel is widely used in various equipment and components due to its high strength and excellent mechanical properties. However, during the manufacturing process or in service, tiny cracks will inevitably generate, which is one of the main causes of the failure of structural components. The initiation and propagation of crack reduce the service life of the workpiece, and may even bring unpredictable catastrophic failure. It would be a huge economic loss and waste of resources if a cracked workpiece is discarded directly. In contrast, repairing is the most economical and environment-friendly way.

Usually, iron-based, nickel-based and cobalt-based powders are mainly used for laser repair of steel or similar materials. However, traditional composite powders produce some defects in the repair process, such as the occurrence of pore and crack in the repaired layer. In addition, the poor fusion of the bonding surface between the repaired layer and the substrate results in flaws, which provides a convenient path for crack propagation. At present, there is no metal powder dedicated for laser repair that could make repaired layer have satisfactory compactness, and there is no metal powder dedicated for laser repair that could improve fracture performance, especially of stainless steel parts.

Therefore, it is necessary to provide a composite powder for laser repair of tiny cracks in stainless steel surface to realize the tight bonding of the repaired layer and the substrate, to increase the compactibility of the repaired layer, to achieve high strength and toughness, and to improve the fracture property of the repaired layer.

SUMMARY

To overcome the defects in the above laser repair process, the present invention provides a micro-nano composite powder for laser repair of tiny cracks in stainless steel surface, with an aim to obtain a repaired layer free of crack and with excellent strength and fracture property. Another purpose of the present invention is to obtain a metallurgically bonded interface and a repaired layer with fine grains.

To achieve the above purposes, the present invention adopts the following technical solution:

A micro-nano composite powder dedicated for laser repair of tiny cracks in stainless steel surface, characterized in that: the composite powder comprises 3 wt %-7 wt % of nano-WC, 0.5 wt %-2 wt % of nano-$Al_2O_3$, 0.2 wt %-0.8 wt % of micro-V powder and the balance of micro stainless steel powder; the stainless steel powder comprises 0.08 wt % of C, 0.5 wt % of Si, 1.46 wt % of Mn, 0.03 wt % of P, 0.005 wt % of S, 19 wt % of Cr, 9.5 wt % of Ni, 0.5 wt % of Mo and the balance of Fe.

The nano-WC powder and nano-$Al_2O_3$ powder are composed of near-perfect spherical particles. The $Al_2O_3$ powder, the nano-WC powder, the V powder and the stainless steel powder are fully mixed through ball milling and further uniformly mixed after being blended with anhydrous ethanol. The nano-WC powder has a particle diameter of 50-80 nm and a purity of 99.99%. The stainless steel powder has a particle diameter of 30-50 μm and a purity of 99.9%, and has good fusion properties with substrate and better performance than the substrate. The V powder has a particle diameter of 20-50 μm and a purity of 99.9%. The nano-$Al_2O_3$ powder has a particle diameter of 30-50 nm and a purity of 99.99%.

The high energy of laser beam will fuse partial of nano-WC powder in the process of laser repair. The rest unfused nano-WC remains in the repaired layer as reinforcement particles, plays the roles of filling and bridging, and hinders the growth of grains at the same time. Uniform and fine grains are eventually formed and the compactibility of the microstructure is improved. Decomposed nano-WC particles are combined with other elements, which not only purify the grain boundary, but also form various kinds of alloy carbides and have the function of solid solution strengthening.

After laser repair of a specimen, near-spherical nano-$Al_2O_3$ particles are dispersively distributed among microstructure and evenly distributed in the repaired layer, which has the function of dispersion strengthening. Meanwhile, the addition of nano-$Al_2O_3$ particles also increases the nucleation concentration, and accelerates the process of grain refining and microstructure densifying in the laser repaired layer. Small grains increase the boundary area in unit volume, which is favorable for improving the mechanical properties of the material. In addition, nano-$Al_2O_3$ particles can inhibit the foil cation of crack in the repaired layer.

The V powder is mainly used as an activator in the process of laser repair, and can refine grains in the microstructure to a certain extent. The composition of the stainless steel powder is similar to that of the substrate, which increases the compatibility of the repaired layer and the substrate, enhances the strength of metallurgical bonding between the repaired layer and the substrate.

Compared with the prior art, the present invention has the following advantages:

The composite powder with the above composition provided by the present invention is particularly suitable for laser repair of tiny cracks in the surface of stainless steel part with high toughness requirements. When this composite powder is used for laser repair, tiny cracks in the part is repaired without the need for preheating and post heat treatment. After laser repair, the composite powder fuses fully with the substrate, the repaired layer and the substrate are metallurgically bonded at the interface with no crack or impurity; meanwhile, uniform and fine grains are obtained in the repaired layer, ingredients are uniformly distributed, and therefore the compactness of the repaired layer is improved. In addition, fracture property of the material is improved after laser repair.

DESCRIPTION OF DRAWINGS

FIG. 3 is a diagram showing the interface between the laser repaired layer and the substrate of stainless steel.

FIG. 4 is a diagram showing the microstructure in the laser repaired layer of stainless steel.

DETAILED DESCRIPTION

The present invention is described in detail below through specific embodiments. The embodiments are implemented on the premise of the present invention and detailed implementation mode and specific operation procedures are given, but the protection scope of the present invention is not limited to the following embodiments.

Embodiment 1: comprising 5 wt % of nano-WC (50-80 nm), 1 wt % of nano-$Al_2O_3$ (30-50 nm), 0.5 wt % of micro-V powder (20-50 μm) and the balance of micro stainless steel powder (30-50 μm), wherein the stainless steel powder comprises 0.08 wt % of C, 0.5 wt % of Si, 1.46 wt % of Mn, 0.03 wt % of P, 0.005 wt % of S, 19 wt % of Cr, 9.5 wt % of Ni, 0.5 wt % of Mo and the balance of Fe. With the above formulation, the powders are fully mixed through ball milling and further uniformly mixed after being blended with anhydrous ethanol.

Prior to laser repair process, drying treatment is conducted to the composite powder at a temperature of 150° C. for 2 hours; the area to be repaired is sanded with #400-2000 abrasive papers in sequence, cleaned with anhydrous ethanol, and then dried; proportioned composite powder is uniformly applied to a tiny crack to be repaired with a thickness of about 0.8-1.2 mm to ensure a flat surface and low porosity. When repairing, the processing parameters are laser power of 1.5-3 KW, laser repair duration of 1-2 s, spot diameter of 3.0-5.0 mm, and defocusing amount of 220-240 mm.

Figure 1:
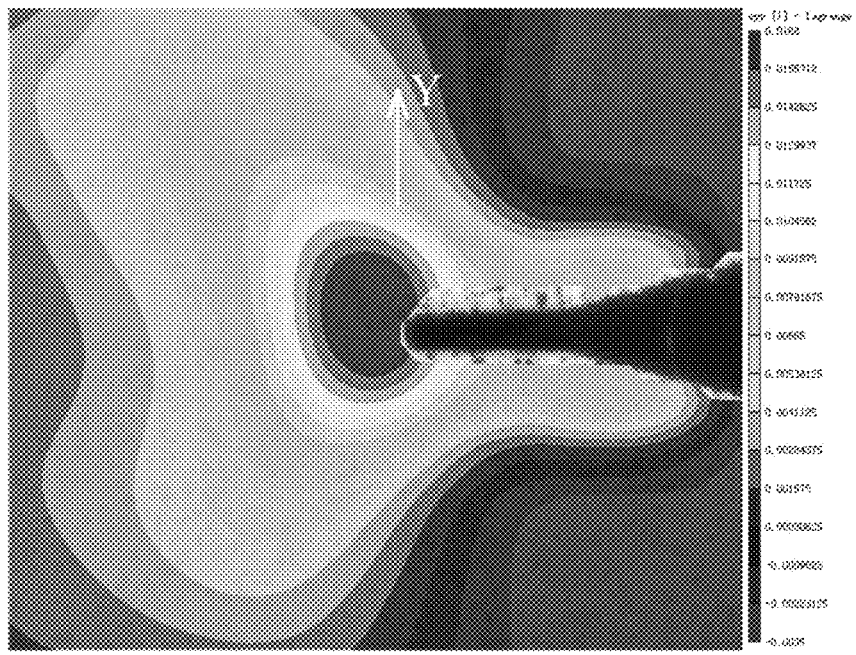
FIG. 1 is a strain contour in Y-direction eyy at the tip of a crack in a laser repaired stainless steel specimen.
Figure 2:
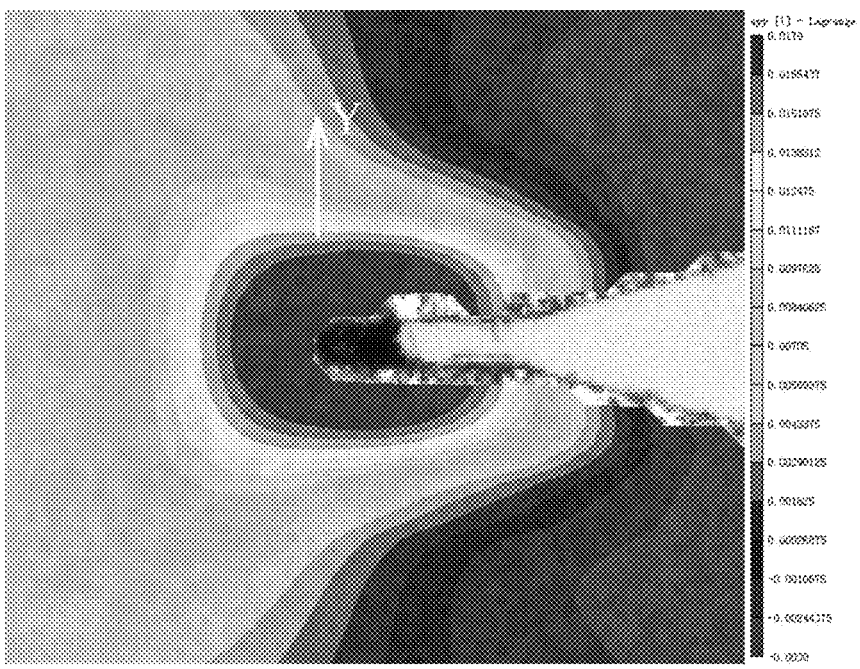
FIG. 2 is a strain contour in Y-direction eyy at the tip of a crack in an unrepaired stainless steel specimen.

After laser repair, the fracture parameters COD of the compact tensile specimen under each load are reduced, wherein the results of Y-direction strain eyy at the tip of a crack in a laser repaired specimen and an unrepaired specimen measured by digital image correlation software under a load of 20 kN are respectively shown in FIG. 1 and FIG. 2. It can be seen from the figures that the Y-direction strain value eyy at the tip of a crack in a laser repaired specimen is smaller than that in an unrepaired specimen. According to the calculation of the digital image correlation software VIC-2D, the fracture parameter COD of the specimen is reduced by 21.9%, indicating that the fracture property of the specimen is improved after repair. In addition, the substrate and the composite powder are metallurgically bonded, as shown in FIG. 3, with no crack or impurity in the bonded area. Meanwhile, as shown in FIG. 4, the grains in the repaired layer at the tip of the crack are refined, and the compactness of the microstructure is significantly improved.

Embodiment 2: comprising 3 wt % of nano-WC (50-80 nm), 2 wt % of nano-$Al_2O_3$ (30-50 nm), 0.8 wt % of micro-V powder (20-50 μm) and the balance of micro stainless steel powder (30-50 μm), wherein the stainless steel powder comprises 0.08 wt % of C, 0.5 wt % of Si, 1.46 wt % of Mn, 0.03 wt % of P, 0.005 wt % of S, 19 wt % of Cr, 9.5 wt % of Ni, 0.5 wt % of Mo and the balance of Fe. With the above formulation, the powders are fully mixed through ball milling and further uniformly mixed after being blended with anhydrous ethanol. The method for laser repair of crack is the same as that using Embodiment 1. The interface is metallurgically bonded after repair; the grains in the repaired layer are refined, and the compactibility of the microstructure is improved; the fracture parameter COD of the specimen is reduced by 19.3% under a load of 20 kN, and the fracture property is improved.

Embodiment 3: comprising 7 wt % of nano-WC (50-80 nm), 0.5 wt % of nano-$Al_2O_3$ (30-50 nm), 0.2 wt % of micro-V powder (20-50 μm) and the balance of micro stainless steel powder (30-50 μm), wherein the stainless steel powder comprises 0.08 wt % of C, 0.5 wt % of Si, 1.46 wt % of Mn, 0.03 wt % of P, 0.005 wt % of S, 19 wt % of Cr, 9.5 wt % of Ni, 0.5 wt % of Mo and the balance of Fe. With the above formulation, the powders are fully mixed through ball milling and further uniformly mixed after being blended with anhydrous ethanol. The method for laser repair of crack is the same as that using Embodiment 1. The interface is metallurgically bonded after repair; the grains in the repaired layer are refined, and the compactibility of the microstructure is improved; the fracture parameter COD of the specimen is reduced by 18.6% under a load of 20 kN, and the fracture property is improved.

We claim:

1. A micro-nano composite powder dedicated for the laser repair of tiny cracks on stainless steel surfaces, wherein the composite powder comprises 3 wt %-7 wt % of nano-WC, 0.5 wt %-2 wt % of nano-$Al_2O_3$, 0.2 wt %-0.8 wt % of micro-V powder and the balance of micro stainless steel powder, wherein the micro and nano powders are fully mixed through ball milling and further uniformly mixed after being blended with anhydrous ethanol; the stainless steel powder comprises 0.08 wt % of C, 0.5 wt % of Si, 1.46 wt % of Mn, 0.03 wt % of P, 0.005 wt % of S, 19 wt % of Cr, 9.5 wt % of Ni, 0.5 wt % of Mo and the balance of Fe.

2. A micro-nano composite powder dedicated for the laser repair of tiny cracks on stainless steel surfaces claim 1, wherein the nano-WC powder has a particle diameter of 50-80 nm and a purity of 99.99%.

3. A micro-nano composite powder dedicated for the laser repair of tiny cracks on stainless steel surfaces of claim 1, wherein the nano-$Al_2O_3$ powder has a particle diameter of 30-50 nm and a purity of 99.99%.

4. A micro-nano composite powder dedicated for the laser repair of tiny cracks on stainless steel surfaces of claim 1, wherein the stainless steel powder has a particle diameter of 30-50 μm and a purity of 99.9%.

5. A micro-nano composite powder dedicated for the laser repair of tiny cracks on stainless steel surfaces of claim 3, wherein the stainless steel powder has a particle diameter of 30-50 μm and a purity of 99.9%.

6. A micro-nano composite powder dedicated for the laser repair of tiny cracks on stainless steel surfaces of claim 1, wherein the V powder has a particle diameter of 20-50 μm and a purity of 99.9%.

7. A micro-nano composite powder dedicated for the laser repair of tiny cracks on stainless steel surfaces of claim 3, wherein the V powder has a particle diameter of 20-50 μm and a purity of 99.9%.

8. A micro-nano composite powder dedicated for the laser repair of tiny cracks on stainless steel surfaces of claim 4, wherein the V powder has a particle diameter of 20-50 μm and a purity of 99.9%.

* * * * *